United States Patent
Eum

(10) Patent No.: US 6,785,271 B2
(45) Date of Patent: Aug. 31, 2004

(54) GROUP SWITCHING SYSTEM FOR MULTIPLE-CHANNEL DATA

(75) Inventor: Jae Uk Eum, Ansan (KR)

(73) Assignee: LG Electronics Inc., Seoul (KR)

( * ) Notice: Subject to any disclaimer, the term of this patent is extended or adjusted under 35 U.S.C. 154(b) by 769 days.

(21) Appl. No.: 09/750,153

(22) Filed: Dec. 29, 2000

(65) Prior Publication Data

US 2001/0006521 A1 Jul. 5, 2001

(30) Foreign Application Priority Data

Dec. 29, 1999 (KR) .......................................... 1999-64883

(51) Int. Cl.[7] .............................................. H04L 12/50
(52) U.S. Cl. ...................... 370/379; 370/412; 370/395.7
(58) Field of Search .......................... 370/366, 370–376, 370/378, 379, 381–383, 375, 394, 503, 442, 412, 395.7, 395.72, 371, 372, 395.71; 379/350; 704/201

(56) References Cited

U.S. PATENT DOCUMENTS

| | | | | |
|---|---|---|---|---|
| 4,093,827 A | * | 6/1978 | Charransol et al. | 370/366 |
| 4,543,652 A | * | 9/1985 | Amada et al. | 370/368 |
| 4,941,141 A | * | 7/1990 | Hayano | 370/376 |

* cited by examiner

*Primary Examiner*—Ricky Ngo
*Assistant Examiner*—Ian Moore
(74) *Attorney, Agent, or Firm*—Fleshner & Kim, LLP

(57) ABSTRACT

A group switching apparatus for multi-channel data is disclosed. It includes a speech memory to temporarily store a time slot to be switched, and a connection memory (CM) to store group connection information. Also, it includes a processor matching unit to interface group connection information provided from an upper processor to the CM and a counter to count a system clock signal and output a read address for the CM. Additionally, an offset generating unit receives group connection information outputted from the CM and generates a first offset value according to a signal representing an 'ON' state of group connection, and an adder adds the output of the counter and the output of the offset generating unit and outputting the added value as a read address for the SM.

32 Claims, 9 Drawing Sheets

FIG. 7A

| | SM |
|---|---|
| 0 | |
| | |
| 4 | !! |
| 5 | @@ |
| 6 | ## |
| 7 | $$ |
| | |
| | |
| | |
| 1023 | |

FIG. 7B

| | GC_ON | GCM GC_OFST |
|---|---|---|
| 0 | 0 | |
| 1 | 0 | |
| 2 | 0 | |
| 3 | 0 | |
| 4 | 1 | −12 |
| 5 | 0 | |
| | | |
| | | |
| 254 | 0 | |
| 255 | 0 | |

FIG. 10A

| | SM |
|---|---|
| 0 | |
| | |
| 4 | !! |
| 5 | @@ |
| 6 | ## |
| 7 | $$ |
| | |
| | |
| | |
| 1023 | |

FIG. 10B

| | CM | | |
|---|---|---|---|
| | GC_ON | P_OFST | GC_NUM |
| 0 | 0 | | 0 |
| 1 | 0 | | 0 |
| | 0 | | 0 |
| | 0 | | 0 |
| 14 | 0 | | 0 |
| 15 | 0 | | 0 |
| 16 | 1 | −12 | 3 |
| | | | |
| 1022 | 0 | | 0 |
| 1023 | 0 | | 0 |

GROUP SWITCHING SYSTEM FOR MULTIPLE-CHANNEL DATA

BACKGROUND OF THE INVENTION

1. Field of the Invention

The present invention relates to a public switch telephone network (PSTN) switching system, and more particularly, to a group switching apparatus of a multi-channel data system capable of performing a multi-channel service.

2. Background of the Related Art

In general, a PSTN switching system provides a multi-channel service by combining at least two channels to accommodate more than 64 Kbps data traffic. In such a case, the generated multi-channel data is processed by mutual interaction between a switch hardware (H/W) (such as a time switch) for switching data by a single channel unit and software (S/W) for controlling and managing the switch H/W.

FIG. 1 is a schematic block diagram of a related art time switch having a single channel switching structure. As shown in FIG. 1, the related art time switch includes a speech memory (SM) 10, a counter 12, a connection memory (CM) 14 and a processor interface unit 16.

As a dual port random access memory (DPRAM) for temporarily storing an input time slot (TS), the speech memory (SM) 10 is accessed by a write address (SM_WA) and a read address (SM_RA).

The counter 12 provides the SM 10 and the CM 14 with an access address. The counter 12 counts a system clock signal (CLOCK) that has the same period as the interval of one time slot (TS). If 1024 time slots (TS) are multiplexed in one frame, a count value is sequentially increased from '0' to '1023'. The corresponding count value is provided to the write address (SM_WA) of the SM 10 and to the read address (CM_RA) of the CM 14.

The CM 14 is a DPRAM in which connection information provided by the S/W is stored. Connection data (CM_CD) stored in the CM 14 is read by the CM_RA and then provided to the read address (SM_RA).

The processor interface unit 16 communicates with control S/W of an upper processor (not shown) through a control bus (C-BUS) and records connection information received from the control S/W in the CM 14.

The multi-channel switching operation of the related art time switch constructed as described above will now be described.

First it is assumed for this example that 1024 time slots (TS) are multiplexed in one frame and a subscriber requests 4-channel service. It is further assumed that four time slots (TS#4~TS#7) on an input highway (IN_HW) should be switched to four different time slots (TS#16~TS#19) on an output highway (OUT_HW).

When 4-channel service is requested by the subscriber, the control S/W of an upper processor receives a command from its upper processor (that is, an upper-upper processor) (not shown) that the input time slots (TS#4~TS#7) are to be switched to the output time slots (TS#16~TS#19).

Upon receipt of the command, the S/W determines connection formation (CM_CA and CM_CD) to be recorded in the CM 14 as shown in the below Table 1 and outputs them to the processor interface unit 16 through the control bus (C-BUS) four times.

TABLE 1

| IN_TS | OUT_TS | CM_CA | CM_CD |
|-------|--------|-------|-------|
| TS #4 | TS #16 | 16 | 4 |
| TS #5 | TS #17 | 17 | 5 |
| TS #6 | TS #18 | 18 | 6 |
| TS #7 | TS #19 | 19 | 7 |

Accordingly, as shown in FIG. 3B, the CM_CD '4~7' are sequentially recorded in the addresses '16~19' of the CM 14 by the processor interface unit 16. Thereafter, in order to check an error for the CM_CD as recorded in the CM 14, the control S/W sequentially transmits the CM_CA (16~19) and performs a reading operation of the CM_CD (4~7) four times.

Meanwhile, with reference to FIG. 2, data (!!,@@, ## and $$) of four time slots (TS#4~TS#7) inputted through the input highway (IN_HW) are sequentially recorded in the SM 10 according to write addresses (SM_WA) '4~7' as shown in FIG. 3A.

Thereafter, when an input time of the time slots (TS#16~TS#19) reaches as time lapses, the read addresses (CM_RA) of the CM 14 are sequentially increased from 16 to 19 by the counter 12, so that the connection data (4~7) recorded in the addresses 16~19 of the CM 14 are read by the CM_RA and outputted to the read address (SM_RA) of the SM 10.

Accordingly, the time slot data (!!,@@, ##, $$) stored in the addresses 4~7 of the SM 10 are sequentially read by the SM_RA (4~7) and outputted to the output highway (OUT_HW). Thus, the switching operation is performed from the time slots (TS#4~TS#7) to the time slots (TS#16~TS#19).

The related art time switch has various problems. For example, it has only a single channel switching structure. Thus, when processing a multi-channel service using the related art time switch, the control S/W must write the channel connection information in the CM as many times as there are channels. In addition, in order to check whether there is an error for the data stored in the CM, the control S/W has to manage connection information of each channel. Specifically, the control S/W must read the connection information from the CM as many times as there are channels. These factors disadvantageously lead to complexity in the control S/W and generation of an excessive amount of management data where the multi-channel service is implemented, resulting in degradation in efficiency in processing the multi-channel service.

The above references are incorporated by reference herein where appropriate for appropriate teachings of additional or alternative details, features and/or technical background.

SUMMARY OF THE INVENTION

An object of the invention is to provide a group switching apparatus for multi-channel data that substantially obviates problems caused by disadvantages in the related art.

Another object of the present invention is to provide a group switching apparatus for multi-channel data which performs multi-channel switching using the same controlling operation as the single-channel switching system, thereby improving efficiency of a multi-channel service.

Another object of the present invention is to provide a group switching apparatus for multi-channel data that can provide various multi-channel services without changing the construction of a circuit.

To achieve at least these objects, in whole or in parts, there is provided a group switching apparatus of a multi-channel data including a speech memory (SM) for temporarily storing a time slot to be switched; a connection memory (CM) for storing single connection information; a group connection memory (GCM) for storing group connection information; a counter for counting a system clock signal and outputting a read address for the CM; and address generating unit for converting an output of the counter and generating a read address for the GCM; a processor matching unit for interfacing connection information provided from an upper processor to the CM or GCM; a multiplexer for selectively outputting the output of the CM or the output of the to GCM according to the connection state signal outputted from the GCM; and an adder for adding the output of the counter and the output of the multiplexer and outputting the added value as a read address for the SM.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIGS. 7A and 7B illustrate a storage form of a speech memory and a group connection memory in accordance with the first embodiment of the present invention;

FIGS. 10A and 10B illustrate a storage form of a speech memory and a connection memory in accordance with the second embodiment of the present invention;

DETAILED DESCRIPTION OF PREFERRED EMBODIMENTS

Figure 1:
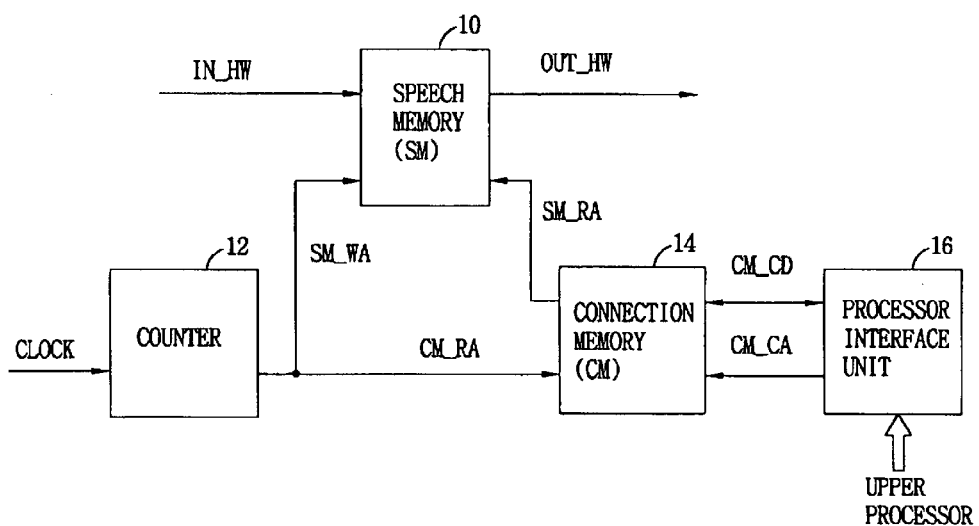
FIG. 1 is a schematic block diagram of a related art time switch having a single channel switching structure.
Figure 2:
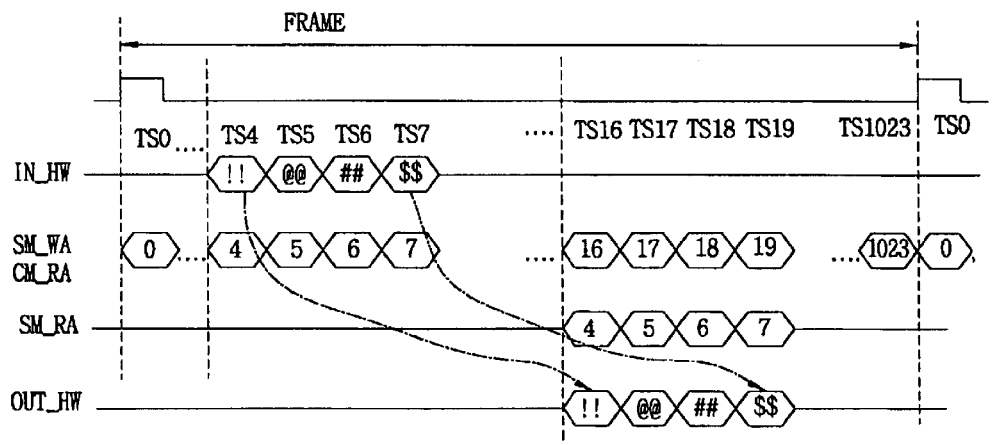
FIG. 2 is a drawing illustrating an input/output timing for performing a multi-channel switching operation of FIG. 1.
Figure 3A:
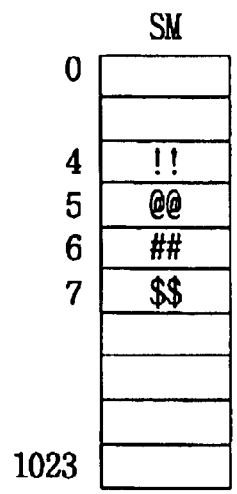
FIGS. 3A and 3B illustrate a related art storage form of a speech memory and a connection memory.
Figure 3B:
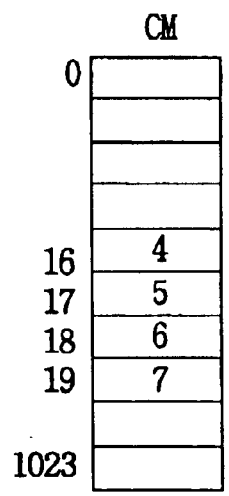
Figure 4:
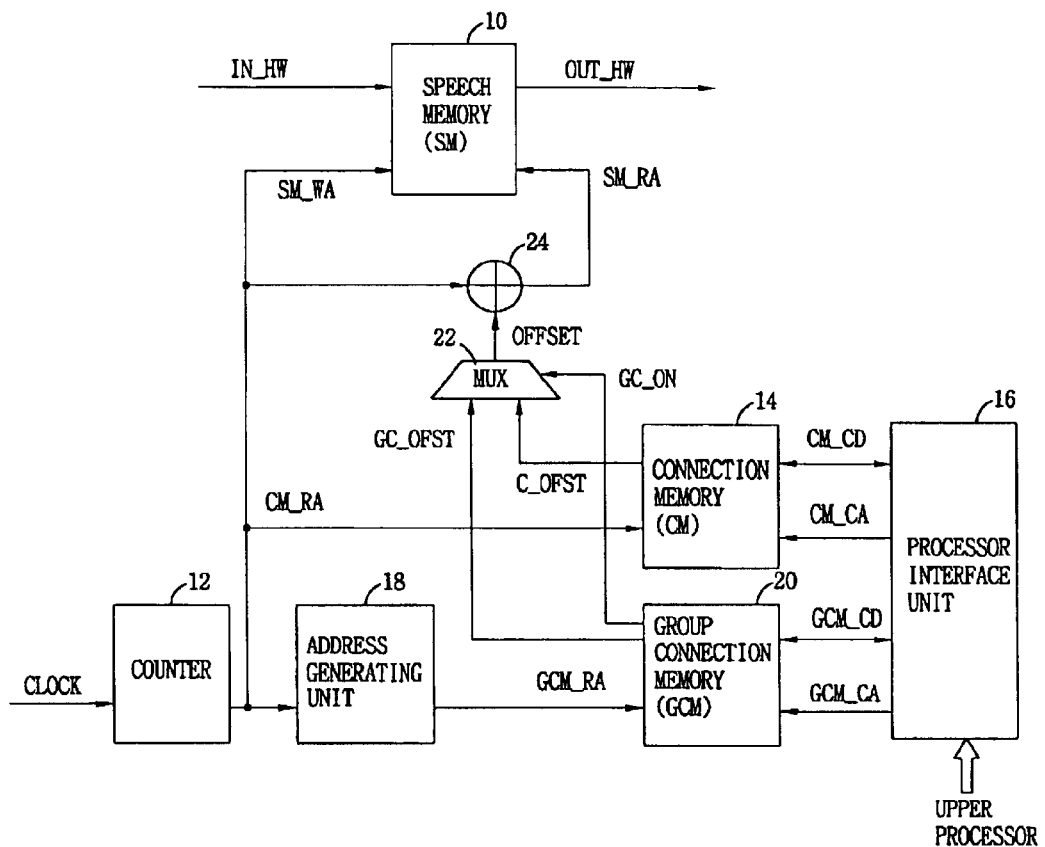
FIG. 4 is a schematic block diagram illustrating a group switching apparatus for multi-channel data in accordance with a first embodiment of the present invention.

FIG. 4 illustrates a group switching apparatus for multi-channel data in accordance with a first embodiment of the present invention. The group switching apparatus is preferably capable of selectively performing single channel switching and group channel (multi-channel) switching, under the control of a control S/W. The group switching, apparatus, according, to a first embodiment, preferably includes a CM 14 to store single connection information and a GCM 20 (group connection memory) to store group connection information. The single-channel switching, and the group-channel switching, are selectively performed using, these elements.

Figure 5:
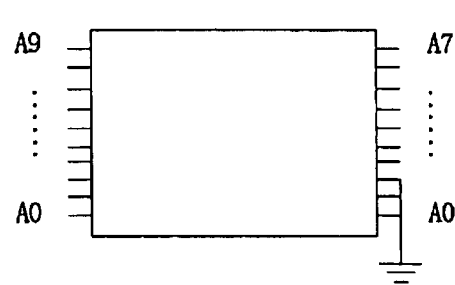
FIG. 5 is a block diagram showing a construction of an address generating unit of FIG. 4.

An address generating unit 18 is provided to bit-shift an output of a counter 12 to generate a read address (GCM_RA) for the GCM 20. When performing group switching of a 4-channel unit (1024 time slots), the address generating unit 18 preferably shifts a 10-bit count value to an 8-bit count value, as shown in FIG. 5. The address generating unit 18 directly determines the group size to be switched, and a plurality of time slots (TS) are divided into a plurality of groups according to the determined group size. For example, if a group size is '4' (4-channel switching), out of 1024 time slots, the time slots TS#0·TS#3 forms a group #0, time slots TS#4~TS#7 forms a group #1, and in this matter, time slots TS#1020~TS#1023 forms a group #255.

The GCM 20 is preferably a DPRAM for recording group connection information, which includes a GC_ON field and a GC_OFST field. Group connection data (GCM_CD) is preferably stored in the GC_OFST field, while a signal (GC_ON) representing a 'ON' state of group connection is preferably stored in the GC_ON field. Thus, a GC_ON set to '1' represents a group connection state, while if it is set to '0', it represents a single connection state.

If a GC_ON outputted from the GCM 20 is '0' (the single connection state), a multiplexer 22 outputs C_OFST as read in the CM 14. If, however, the GC_ON is '1', the multiplexer 22 outputs GC_OFST as read in the GCM 20. An adder 24 adds an output of the counter 12 and an output of the multiplexer 22, and outputs the added value as a read address (SM_RA) to the SM 10.

The operation of the group switching apparatus of a multi-channel data in accordance with the first embodiment of the present invention will now be described with reference to the accompanying drawings.

1. Group (multi-channel) Switching

An example is taken in which a subscriber requests 4-channel service. This is the same case as described with reference to the related art.

If 4-channel service is requested, the control S/W of an upper processor receives a command from its upper processor (that is, an upper-upper processor) that input time slots (TS#4~TS#7) (group #1) to be switched to output time slots (TS#16~TS#19) (group #4).

Upon receipt of the command, the control S/W determines group connection information (GCM_CA and GCM_CD) to be recorded in the GCM 20 and outputs this data to the processor interface unit 16 through a control bus (C_BUS), as shown below.

GCM_CA = TS group # of OUT_HW = 4

GCM_CD = GC_ON = 1

= GC_OFST = [(TS group # of IN_HW) − (TS group # of

OUT_HW)] × group size = (1 − 4) × 4 = −12.

Figure 6:
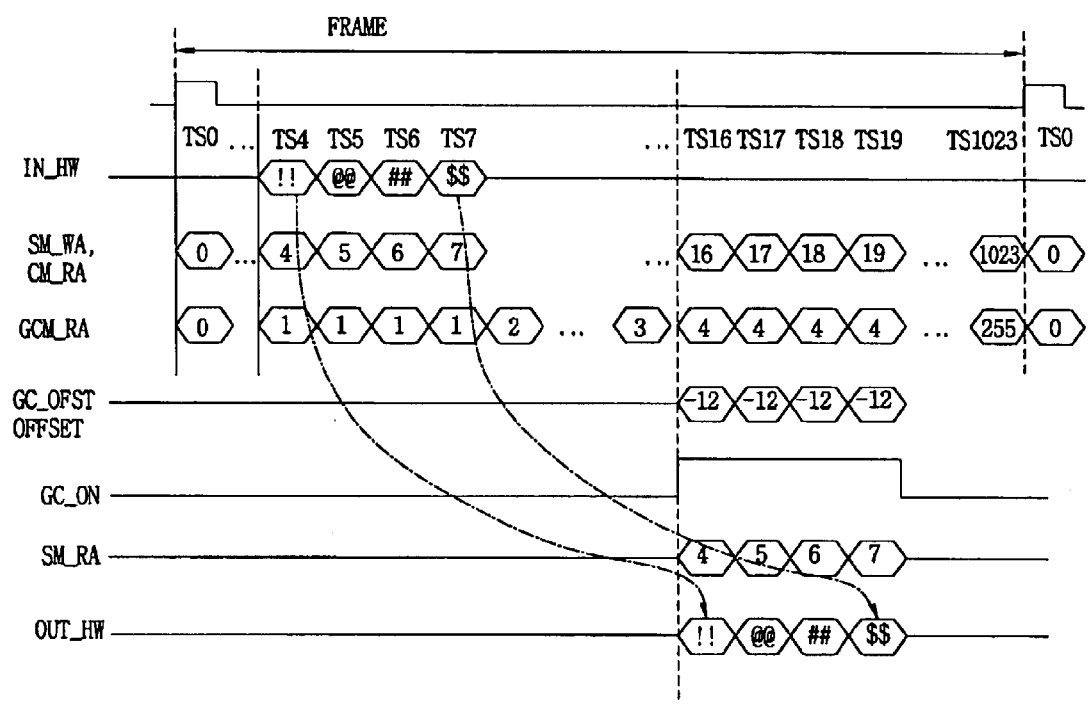
FIG. 6 is a drawing illustrating input/output timing for performing a group switching operation in accordance with the first embodiment of the present invention.

Accordingly, group connection information is outputted to the GCM 20 by the processor interface unit 16, and, as shown in FIG. 7B, '1' is recorded in the GC_ON field and '−12' is recorded in the GC_OFST field of the GCM 20, respectively. And, as shown in FIG. 6, the data (!!, @@, ##, and $$) of input time slots (TS#4~TS#7) (group #1) is sequentially recorded in the SM 10 in every frame according to SM_WA (4~7), as shown in FIG. 7A.

When the input time of time slots (TS#16~TS#19) is reached as time lapses, since the output values of the counter are sequentially 16, 17, 18 and 19, the address generating unit 18 shifts by 2 bit the inputted count values (16~19) and outputs a GCM_RA '4' to the GCM 20.

As a result, GC_ON ('1') and GC_OFST ('−12'), as recorded in the address '4' of the GCM 20, are read and outputted to the multiplexer 22. The multiplexer 22 in turn outputs a GC_OFST of '−12' to the adder 24 as an offset value (OFFSET) according to the GC-ON of '1'. Then, the adder 24 sequentially adds the output values (16~19) of the counter 12 and the offset value of '−12' and outputs SM_RA 4, 5, 6 and 7.

Accordingly, the time slot data (!!, @@, ## and $$) stored in the addresses 4~7 are sequentially read and outputted to the output highway (OUT_HW), so that the data (!!, @@, ## and $$) of the time slots (TS#4~TS#7) are switched to the time slots (TS#16~TS#19).

2. Single-channel Switching

The next example assumes a case in which the input time slot (TS#4) is to be switched to the output time slot TS#16). The control S/W first determines single connection information (CM_CD and CM_CA) to be recorded in the CM 14, and subsequently records it in the CM 14 through the processor interface unit 16, as shown below. At this time, the data (!!) of the time slot (TS#4) is recorded in the SM 10 in every frame, according to the SM_WA4.

CM_CA=TS# of OUT_HW=16
CM_CD=C_OFST=4 (TS# of IN_HW)−16 (TS# of OUT_HW)=−12

Thereafter, as an input time of the time slot (TS#16) is reached, since the CM_RA is 16, the C_OFST of '−12' recorded in the address '16' of the CM 14 is outputted, and the multiplexer 22 outputs the C_OFST of '−12' as an offset value (OFFSET), according to the GC_ON of '0'.

Accordingly, the adder 24 adds the offset value (OFFSET) '−12' and the output value '16' of the counter 12, and outputs SM_RA '4', so that the time slot data (!!) recorded in the address '4' of the SM 10 is outputted to the output highway (OUT_HW).

As described above, the group switching apparatus of a multi-channel data according to the first embodiment of the present invention preferably performs the controlling and managing operation for the group (multi-channel) switching in the same manner as in the single-channel switching. That is, the control S/W performs the writing and reading operation of the group connection information into and from the GCM only one time for group switching. Therefore, in implementing a multi-channel service, complexity of the control S/W can be avoided and the generation of management data can be reduced, so that efficiency in multi-channel service processing can be heightened.

Figure 8:
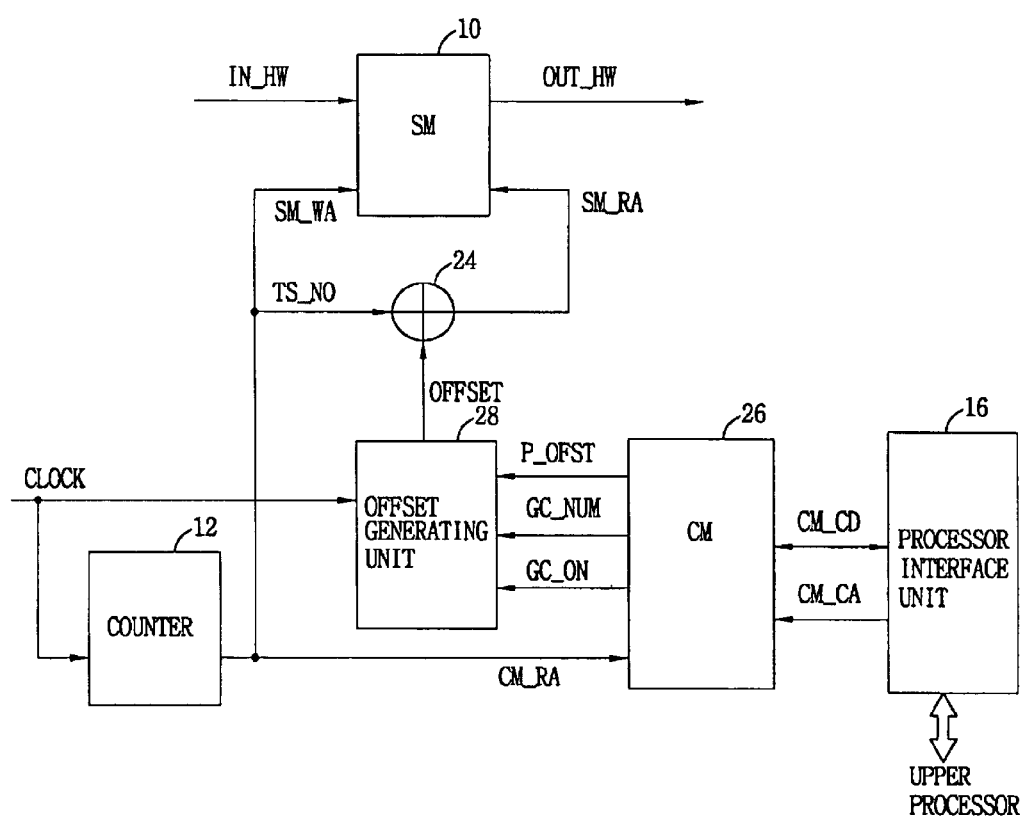
FIG. 8 is a schematic block diagram illustrating a group switching apparatus for multi-channel data in accordance with a second embodiment of the present invention.
Figure 9:
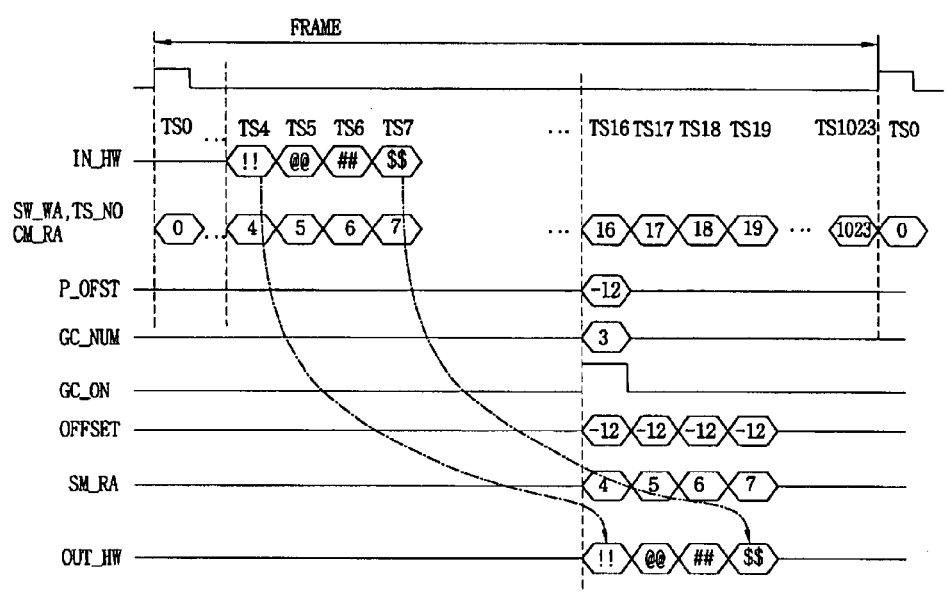
FIG. 9 is a drawing illustrating input/output timing for performing a group switching operation in accordance with the second embodiment of the present invention.

FIG. 8 is a schematic block diagram of a group switching apparatus of a multi-channel data in accordance with a second embodiment of the present invention.

Using the first embodiment of the present invention, a logic of the address generating unit is initially determined in advance depending on the group size (the number of channels). Thus, in the second preferred embodiment, a group switching apparatus for multi-channel data advantageously implements group switching of various group sizes as well as a single-channel switching by varying connection information stored in the CM 26.

Referring to FIG. 8, the CM 26 is preferably a DPRAM for storing both single connection information and group connection information. This includes a GC_ON field, a P_OFST field, and a GC_NUM field. In each field, as shown in FIG. 10B, connection information (CM_CD) provided from the control S/W, that is, P_OFST, GC_NUM, and GC_ON, are respectively stored. In this respect, the offset value (P_OFST) represents a difference between an input slot number and an output time slot number, and the group connection number (GC_NUM(has a value of a group size minus 1 (i.e., group size −1).

The offset generating unit 28 preferably generates a final offset signal (OFFSET) on the basis of the P_OFST, the GC_NUM, and the GC_ON outputted from the CM 26. If the value of GC_ON is '0' (single-channel switching), the offset generating unit 28 outputs the P_OFST as 'OFFSET' as it is, while if the value of GC_ON is '1' (group switching), it repeatedly outputs the P_OFST as many as GC_NUM+1 number as 'OFFSET'.

Figure 11:
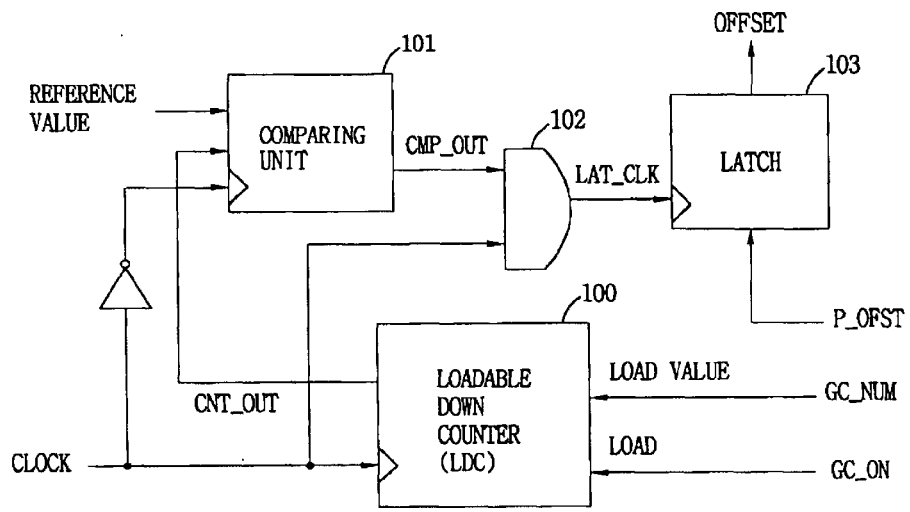
FIG. 11 is a block diagram illustrating a construction of an offset generating unit of FIG. 8 in accordance with the second embodiment of the present invention.

FIG. 11 is a block diagram showing a construction of the offset generating unit of FIG. 8. The offset generating unit 28 preferably includes a loadable down counter (LDC) 100 for loading a GC_NUM according to the value of the GC_ON signal, and counting it down. It also includes a comparing unit 101 for comparing whether the output of the LDC 100 is identical to a reference value (for example, '0'), an AND gate 102 for ANDing the output of the comparing unit 101 with a system clock signal (CLOCK). Finally, a latch 103 is provided for latching the P_OFST according to an output of the AND gate 102.

An operation of the group switching apparatus for multi-channel data according to the second embodiment-of the present invention will now be described. First, group (multiple-channel) switching will be described, followed by single-channel switching.

1. Group (Multi-channel) Switching

If 4-channel service is requested by a subscriber, control S/W of an upper processor receives a command from its upper processor (that is, an upper-upper processor) that a first group of time slots (TS#4~TS#7) of the input highway IN_HW) are to be switched to a second group of the time slots (TS#16~TS#19) of the output highway (OUT_HW).

The control S/W then determines connection information (CM_CA and CM_CD) to be recorded in the CM 26, and outputs the connection information to the processor matching unit 16 through the control bus (C_BUS). The processor matching unit 16 records the received connection information in the CM 26. The values of CM_CA and CM_CD for this example are given below.

CM_CA=TS# of OUT_HW=16
CM_CED : GC_ON=1
P_OFST=TS# of IN_HW−TS# of OUT_HW=4−16=−12
GC_NUM=group size −1=4−1=3

Accordingly, as shown in FIG. 10B, '1' is recorded in the GC_ON field, '−12' is recorded in the P_OFST field, and '3' is recorded in the GC_NUM field of the CM 26. The data (!!, 00, ## and $$) of the input time slots (TS#4~TS#4) is recorded in the addresses 4~7 of the SM 10 in every frame, as shown in FIG. 10A.

Thereafter, when an input time of the time slots (TS#16~TS#19) is reached, since the output values of the counter 12 (which is CM_RA) become 16, 17 18, and 19, the CM 26 outputs 1,0,0,0 as a GC_ON value, −12,0,0,0 as a P_OFST value, and 3,0,0,0 as a GC_NUM value.

Figure 12:
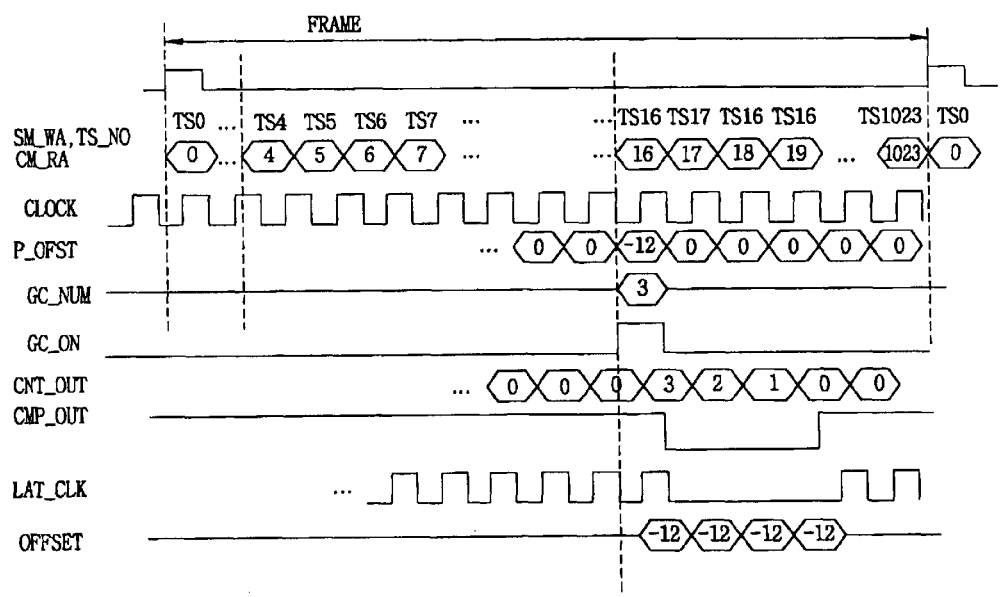
FIG. 12 is a drawing illustrating an input/output timing of an offset generating unit of FIG. 11 in accordance with the second embodiment of the present invention.

Accordingly, the offset generating unit 28 outputs −12, −12, −12, −12 as offset values (OFFSET) at the time when the time slots (TS#16~TS#19) are inputted. That is, as shown in FIG. 11, if a GC_ON='1' is inputted, the LDC 100 loads a GC_NUM '3' and counts down at a positive edge of the system clock signal (CLOCK) as shown in FIG. 12. The comparing unit 101 preferably receives the count value and compares it with a reference value ('0') at the negative edge of the system clock signal (CLOCK). Upon comparison, if the count value (CNT_OUT) differs from the reference value, the comparing unit 101 outputs a low level signal. If, however, the count value is identical to the reference value, the comparing unit 101 outputs a high level signal. The AND gate 102 then ANDs the system clock signal (CLK) and the output of the comparing unit 101, to output a low level latch clock signal (LAT_CLK).

As a result, according to the low level latch clock signal (LAT_CLK), the latch 103 outputs the P_OFST of '−12' to the adder 24 four times, and the adder 24 sequentially adds the output value (16~19) of the counter 12 and the offset value (OFFSET) '−12', to output an SM_RA of 4, 5, 6, and 7.

Accordingly, the designated time slot data (!!, @@, ## and $$) of the addresses 4~7 are read from the SM 10 and outputted to the output highway (OUT_HW).

In that manner, the group switching apparatus for multi-channel data in accordance with the second embodiment of the present invention is capable of switching as many channels as desired by changing the values of the P_OFST and the GC_NUM of the CM 26 for group switching. Thus, any number of channels could be switched in this manner, and the use of four channels is by way of example only.

2. Single-channel Switching

For single-channel switching, '0' is recorded in both the GC_ON field and in the GC_NUM field. The offset generating unit 28 outputs the P_OFST value outputted from the CM 26 as an offset value (OFFSET). It is assumed that the output of the LDC 100 with respect to the present clock signal CLOCK is defined as LDC_OUT$_n$ and that the output of the LCD 100 with respect to the previous clock signal CLOCK is LDC_OUT$_{n-1}$, with reference to FIG. 11. At this time, if a GC_ON is '0', the output of the LDC 100 is expressed as follows.

LDC_OUT$_n$=0, if LDC_OUT$_{n-1}$=0

LDC_OUT$_n$=LDC_OUT$_{n-1}$−1, if LDC_OUT$_{n-1}$>0

That is, if the GC_ON is '0' and the previous output (CNT_OUT) is '0', the LDC 100 continuously outputs count value '0' without loading a new value. Therefore, since the output (CNT_OUT) of the LDC 100 is '0' and the output of the comparing unit 101 is at a high level, the latch clock (LAT_CLK) outputted from the AND gate 102 is identical to the system clock signal (CLOCK). Thus, the latch 103 outputs the P_OFST as is, according to the latch clock signal (LAT_CLK). The follow-up processes are performed in the same manner as in the group switching method. The descriptions are thus omitted.

In the second embodiment, if it is desired that a group size to be switched be changed, the connection information stored in the P_OFST field and in the GC_NUM field is changed. Thus, group switching of various sized groups can readily be performed.

The group switching apparatus of a multi-channel data of the present invention has many advantages. For example, since the control/managing operation of the single-channel switching is also performed for the multi-channel switching, efficiency of the multi-channel service can be highly improved.

In addition, by changing the connection information stored in the CM, group switching of various sizes can be performed without undue burden.

Also, it is possible to modify existing related art circuits to accommodate the multi-channel capability.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A group switching apparatus for multiple-channel data, comprising:

a speech memory (SM) coupled to temporarily store at least one time slot to be switched;

a connection memory (CM) coupled to store single connection information;

a group connection memory (GCM) coupled to store group connection information;

a counter coupled to count a system clock signal and output a read address to the CM;

an address generator configured to convert an output of the counter and generate a read address for the GCM;

a processor matching unit configured to provide interfacing connection information received from an upper processor to one of the CM and GCM;

a multiplexer coupled to selectively output an output of the CM or an output of the GCM according to a connection state signal outputted from the GCM; and an adder coupled to add an output of the counter and the output of the multiplexer, and output an added value as a read address for the SM.

2. The apparatus of claim 1, wherein the address generator generates the read address for the GCM by bit-shifting the output of the counter.

3. The apparatus of claim 1, wherein the CM comprises an offset field to store an offset value for a single connection.

4. The apparatus of claim 3, wherein a value of the offset field is obtained by subtracting a time slot number of an output highway from a time slot number of an input highway.

5. The apparatus of claim 4, wherein the time slot number of the input highway corresponds to the at least one time slot to be switched.

6. The apparatus of claim 1, wherein the GCM comprises:

a state field configured to store a state signal representing one of an ON and OFF state of a group connection; and an offset field, configured to store an offset value for the group connection.

7. The apparatus of claim 6, wherein a value of '1' stored in the state field represents a group connection state, and a value of '0' stored in the state field represents a single connection state.

8. The apparatus of claim 6, wherein the offset value is determined by multiplying a difference of a time slot group number of an input highway minus a time slot group number of an output highway, by a group size.

9. The apparatus of claim 8, wherein the time slot group number of the input highway corresponds to the time slot to be switched, and the time slot group number of the output highway corresponds to a time slot to which the time slot to be switched is switched to.

10. The apparatus of claim 1, wherein the address generator shifts the output of the counter by 2 bits.

11. The apparatus of claim 1, wherein the multiplexer outputs an offset value of the GCM if the connection state signal is '1', and outputs an offset value of the CM if the connection state signal is '0'.

12. A group switching apparatus for multiple-channel data, comprising:

a speech memory (SM) coupled to temporarily store a time slot to be switched;

a connection memory (CM) coupled to store group connection information;

a processor matching unit configured to interface the CM to group connection information received from an upper processor;

a counter coupled to count a system clock signal and output a read address for the CM;

an offset generator coupled to receive the group connection information outputted from the CM and generate a first offset value according to a state signal of a group connection; and an adder coupled to add an output of the counter and the output of the offset generating unit and output the added value as a read address for the SM.

13. The apparatus of claim 12, wherein the CM comprises:

a state field configured to store the state signal representing one of an ON state and an OFF state of the group connection;

an offset field configured to store a second offset value for the group connection; and a number field configured to store a group connection number.

14. The apparatus of claim 13, wherein the state signal '1' represents a group connection state, and the state signal '0' represents a single connection state.

15. The apparatus of claim 13, wherein the second offset value is set to a difference between an input time slot number and an output time slot number.

16. The apparatus of claim 15, wherein the input time slot number is the time slot to be switched, and the output time slot number is a time slot that the time slot to be switched is switched to.

17. The apparatus of claim 13, wherein a value stored in the number field is a group size minus '1'.

18. The apparatus of claim 13, wherein the second offset value and the group connection number are '0' in a single connection.

19. The apparatus of claim 13, wherein, if the state signal is '0', the offset generator outputs the second offset value outputted from the CM as it is, and if the state signal is '1', the offset generator repeatedly outputs the second offset value for a number of times equal to the group connection number plus '1' as the first offset value.

20. The apparatus of claim 12, wherein the offset generator comprises:

a loadable down counter (LDC) configured to load a group connection number when the state signal is '1', and count it down using the system clock signal;

a comparator configured to determine whether the count value of the LDC is equal to a reference value;

a logic gate to logically combine an output of the comparator and the system clock signal; and a latch configured to output a second offset value outputted from the CM according to a latch clock signal outputted from the logic gate as a first offset value.

21. The apparatus of claim 20, wherein when the reference value is '0' and the state signal is '0', the LDC continuously outputs count value "0" without loading a new value.

22. The apparatus of claim 20, wherein the LDC counts down the group connection number at a positive edge of the system clock signal, and the comparator performs its comparing, operation at a negative edge of the system clock signal.

23. The apparatus of claim 20, wherein the latch repeatedly outputs the second offset value provided from the CM for a number of times equal to the group connection number plus '1' in group connection.

24. A multiple channel time switch, comprising:

a memory device coupled to receive input data in at least one time slot;

a counter coupled to receive a system clock signal and output a read address signal;

a connection memory coupled to receive the read address signal, a state signal, and connection information to generate offset information; and an offset circuit coupled to selectively output a first output of the connection memory and a second output of the connection memory in response to a control signal, and add the selected output to the output of the counter to generate an offset signal to switch the time slot of the input data.

25. The switch of claim 24, wherein the read address signal comprises a first read address signal and a second read address signal that is a bit shifted first address signal, and wherein the connection memory comprises a single connection memory and a group connection memory, wherein the single connection memory is configured to receive the first read address signal and single connection information to generate the first output, and wherein the group connection memory is configured to receive the second read address signal and group connection information and generate the second output, and wherein the group connection memory generates the control signal.

26. The switch of claim 25, wherein the group connection memory is configured to provide a group connection offset signal to the offset circuit, and wherein the control signal is set to a first prescribed value when group connection information is present and a second prescribed value when no group connection information is present, and wherein the first prescribed value causes the offset circuit to select the second output.

27. The switch of claim 26, wherein the group connection offset signal is determined by multiplying a difference of a time slot group number of an input highway minus a time slot group number of an output highway, by a group size.

28. The switch of claim 25, wherein the control signal is set according to a value of the state signal, and wherein the state signal is in a first state when single connection information is present, and the state signal is in a second state when group information is present.

29. The switch of claim 24, wherein the offset information is one of a first offset value and a second offset value in response to the state signal, and wherein the first offset value is a single offset value used for switching a single connection and the second offset value is a group offset value used for switching a multi-channel connection.

30. The switch of claim 25, wherein the offset circuit comprises a multiplexer to selectively output the first output of the single connection memory and the second output of the group connection memory, and wherein the output circuit further comprises an adder to add the selected output to the first read address signal.

31. The switch of claim 24, wherein the offset circuit comprises:

a loadable down counter (LDC) configured to load a group connection number when the state signal is '1', and count down from the group connection number in accordance with the system clock signal;

a comparator configured to determine whether the count value of the LDC is equal to a reference value;

a logic gate to logically combine an output of the comparator and the system clock signal; and a latch configured to output the second output of the connection memory according to a latch clock signal outputted from the logic gate as an offset value.

32. A multiple channel time switch, comprising:

a memory device coupled to receive input data for at least one time slot;

a counter coupled to receive a system clock signal and output a read address signal;

a connection memory coupled to receive the read address signal, a state signal, and connection information to generate offset information;

a loadable down counter (LDC) configured to load a group connection number when the state signal is '1', and count down from the group connection number in accordance with the system clock signal;

a comparator configured to determine whether the count value of the LDC is equal to a reference value;

a logic gate to logically combine an output of the comparator and the system clock signal;

a latch configured to output one of a first and second output of the connection memory as an offset value according to a latch clock signal outputted from the logic gate.

* * * * *